United States Patent Office 3,193,587
Patented July 6, 1965

3,193,587
PROCESS FOR CHLORINATING A NON-TERMINAL CARBON ATOM OF UNSATURATED PERHALOCARBONS
Charles F. Baranauckas, Niagara Falls, and Russell L. K. Carr, Grand Island, N.Y., assignors to Hooker Chemical Corporation, Niagara Falls, N.Y., a corporation of New York
No Drawing. Filed May 4, 1960, Ser. No. 26,734
4 Claims. (Cl. 260—648)

This invention relates to a process for the replacement of a fluorine atom attached to the carbon atom of a non-terminal double bond by chlorine. More particularly, this invention relates to a process for the replacement of a fluorine atom attached to the carbon atoms of a non-terminal double bond in chlorofluoro-olefins by chlorine using hydrogen chloride and a carbon catalyst wherein at least one of the carbon atoms of the double bond has a fluorine substituent. The substituents on the remaining carbon atoms are perfluorinated.

It is an object of this invention to provide a new process for replacing a substituent on non-terminal double bonds in perchlorofluoro-olefins by chlorine.

Another object is to provide a process such that the raw material is converted to the desired product with a minimum of by-product formation and the unreacted starting material can be recovered and recycled for further conversion to the desired product.

A further object is to provide such a process wherein the product is obtained in high yield.

A further object is to provide a chlorination process wherein the reaction pressure may be maintained at about atmospheric pressure.

A still further object is the replacement of a vinyl fluorine atom in a non-terminal double bonded olefin by chlorine using hydrogen chloride and a carbon catalyst in one step.

Various other objects and advantages will be apparent to those skilled in the art from the following description and disclosure.

The present invention is concerned with the process for the replacement of a fluorine atom attached to the carbon atom of a non-terminal double bond by chlorine which comprises introducing the starting material and hydrogen chloride into a reaction zone containing a carbon catalyst and maintained at a temperature between about one hundred and fifty degrees centigrade and about five hundred degrees centigrade, and withdrawing the product from said zone.

The temperautre varies with the starting material employed. It is preferred to employ a temperature of about two hundred and eighty degrees centigrade to about four hundred and thirty degrees centigrade.

The starting materials which may be converted by the process of this invention have four to twelve carbon atoms and a general formula selected from the group consisting of:

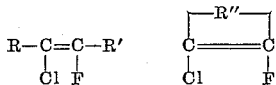

and mixtures thereof, where: R is a perfluoroalkyl or a perfluorocycloalkyl group, and R' is a perfluoroalkyl or a perfluorocycloalkyl group, and may be similar to or different from R, and R" is a perfluoroalkylene group or a perfluoroalkylene group having perfluoro substituents.

The preferred starting compounds are those which contain a maximum of about six carbon atoms attached to the carbon atoms of the non-terminal double bonds. Among the starting materials which may be used in the process of this invention are: 2-chloroheptafluorobutene-2; 1-chloroheptadecafluoro-1-cyclohexylbutene-1; 1-chlorotridecafluoro-4,5-dimethyl cyclohexene; 1-chlorononafluorocyclohexene; 2-chlorononafluoropentene-2; 3-chloroundecafluorohexene-3, and the like.

It is preferred that the reactant hydrogen chloride be substantially anhydrous. The molar ratio of hydrogen chloride to starting material should approach that stoichiometrically required to react with the starting material and may vary from about one to one to about three to one, although the optimum range is between about 1.5 to one and about 2.5 to one.

As will become more evident hereinafter, this invention presents a preferential chlorination technique which is effected by the use of a carbon catalyst in conjunction with a critical temperature. The optimum temperature range is between about two hundred and fifty and about four hundred and fifty degrees centigrade. More preferably, the temperature range is maintained between about two hundred and eighty and four hundred and thirty degrees centigrade. At temperatures above four hundred and fifty degrees centigrade formation of side-products increases substantially thereby reducing the product yield.

The contact time may vary from about 0.1 seconds to about thirty-three seconds at two hundred and ninety degrees centigrade although the preferred contact time is between about one second and eight seconds. The amount of by-product increases as the contact time increases.

The proportions of reactant contacted with a catalyst may vary within relatively wide limits depending largely upon the nature of the reactants, the conditions of operations and the results desired. After passing through the reaction zone, the effluent gases may be cooled and purified and the unreacted raw materials recovered for repassing over the catalyst.

Atmospheric pressure was employed in all the reactions; however, pressures below and above atmospheric will also give satisfactory results.

A specific catalyst used in this invention is that prepared by Barnebey-Cheney Company, Columbus, Ohio, and marketed as "BD-9" graular active carbon which by analysis showed an ash content of 1.6 percent. However, other types of carbon may also be used.

For the purposes of this invention contact time is defined as the ratio between the free space in the reactor (in arbitrary volume units) and the sum of the rates at which the reactants entered the reactor (in the same arbitrary volume units per unit time). An estimate of the free space was obtained in the following way: a graduated cylinder was filled to a given volume mark with catalyst, to this was added an equal volume of solvent liquid and the total volume of the mixture was observed. The difference in volume between that of the mixture and the original solvent represented the space occupied by the catalyst. From this the free space in any catalyst filled container could be estimated provided the volume of said container when empty were known. The rates at which the gaseous reactants entered the reactor was obtained from the molar feed rates per unit time with the application of Charles' Law relating the volume of a gas to its absolute temperature (it was assumed that at the temperatures used deviations from ideality were negligible).

The reactor comprised a one-inch diameter nickel pipe twenty-seven inches long immersed in a salt bath and having a one-quarter inch inlet and outlet as well as a thermo well. The reactor was packed with a catalyst and the temperature maintained reasonably constant by convenient means. The exit end of the reactor was slightly lower than the entrance in order to minimize channeling. The inlet tube was also immersed in the salt bath to serve as a preheater for the inlet gases. It is within the realm of this invention to employ a vertical reactor similar in all respects to the horizontal reactor. It is also possible to use a fluidized reactor. It is to be understood that the invention is not limited to the type of reactor, or the means of heating the catalyst bed, for there are several convenient apparatus means for effecting the process of this invention.

The invention will be more fully understood by reference to the following detailed examples in which the parts are by weight. For convenience, the process is described in connection with specific substances, but they are presented only for the purposes of illustration and not as a limitation, except as defined in the appended claims.

Example 1

Hydrogen chloride and 2-chloroheptafluorobutene-2 in the approximate ratio of 1.3 to one were passed into a nickel reactor containing carbon, acid, washed, the reactor being suspended in a salt bath at two hundred and ninety degrees centigrade. After the reaction was complete, the system was purged with a slow stream of nitrogen. The product, which had been collected under ice water, was neutralized and dried. Infrared analysis of the product showed the presence of 2-chloroheptafluorobutene-2 (fifty-four percent) and 2,3-dichlorohexafluorobutene-2 (thirty-seven percent). The ratio of the cis-trans isomers in the 2,3-dichlorohexafluorobutene-2 was two to three.

Example 2

Monochloroheptafluorocyclopentene

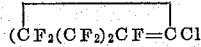

(68.5 parts, 0.3 mols), free of dichlorohexafluorocyclopentene was passed over a carbon catalyst at three hundred and ninety degrees centigrade with enough hydrogen chloride (about forty-five parts), so that the ratio of hydrogen chloride to 1 - monochloroheptafluorocyclopentene averaged from about 2.4/1 to about 2.5/1. Total reaction time was one hour and thirty-five minutes, residence time was about seven to eight seconds. The product mixture (forty-seven parts), was analyzed by infrared, and was shown to contain dichlorohexafluorocyclopentene (sixty-nine percent), trichloropentafluorocyclopentene (twenty-nine percent), and monochloroheptafluorocyclopentene (1.9 percent).

Example 3

The material 2,3-dichlorohexafluorobutene-2

$$(CF_3CCl=CClCF_3)$$

having 2.2 percent in the cis form, was passed through a nickel tube containing acid-washed Barnebey-Cheney coconut charcoal maintained at about two hundred and ninety degree centigrated. The product was collected under ice water from which it was later separated. After drying over anhydrous calcium chloride, it was examined for the cis and trans forms, by infrared analysis, and found to contain thirteen to fourteen percent of cis-2,3-dichlorohexafluorobutene-2.

The compounds produced by the process of this invention are useful as intermediates in processes in which reactions involving olefinic materials are required; such as polymerization, oxidation to mono- and dibasic acids, and the addition of various substances to the double bond.

It is to be understood that the invention is not limited to the examples which have been given. They are only illustrative and modifications may be made within the scope of the appended claims without departing from the spirit of the invention.

We claim:

1. The process for the replacement of chlorine of a fluorine atom attached to the carbon atom of a nonterminal carbon to carbon double bond in a starting material having from four to twelve carbon atoms selected from the group consisting of

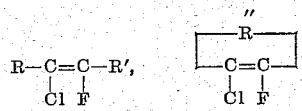

and mixtures thereof, where R and R' are selected from the group consisting of perfluoroalkyl and perfluorocycloalkyl, and R" is a perfluoroalkylene group, which comprises: introducing the starting material and hydrogen chloride into a reaction zone containing a carbon catalyst and maintained at a temperature between about 250 degrees centigrade and about 450 degrees centigrade, and withdrawing the product from said zone.

2. The process of claim 1 wherein the mole ratio of hydrogen chloride to start material is between about one to one and about three to one.

3. The process of claim 1 wherein the contact time of the reactants in the reaction zone is from about 0.1 second to about fifteen seconds.

4. The process of claim 1 wherein the molar ratio of hydrogen chloride to starting material is between about two to one and about 2.5 to one, and wherein the reactants are maintained in the reaction zone for a contact time of from one to six seconds at a temperature between two hundred and seventy-five degrees centigrade and four hundred degrees centrigrade.

References Cited by the Examiner

UNITED STATES PATENTS 2,885,449  5/59  Stahl et al. _____ 260—653.4

LEON ZITVER, *Primary Examiner.*

ALPHONSO D. SULLIVAN, *Examiner.*

UNITED STATES PATENT OFFICE
CERTIFICATE OF CORRECTION

Patent No. 3,193,587                      July 6, 1965

Charles F. Baranauckas et al.

It is hereby certified that error appears in the above numbered patent requiring correction and that the said Letters Patent should read as corrected below.

Column 1, line 50, for "temperautre" read -- temperature --; column 2, line 39, for "graular" read -- granular --; column 3, line 55, for "centigrated" read -- centigrade --; column 4, line 17, for "replacement of" read -- replacement by --; line 36, for "start material" read -- starting material --; line 47, for "centrigrade" read -- centigrade --.

Signed and sealed this 5th day of July 1966.

(SEAL)
Attest:

ERNEST W. SWIDER                      EDWARD J. BRENNER
Attesting Officer                        Commissioner of Patents